C. A. STREET.
GENERATOR.
APPLICATION FILED AUG. 1, 1911.

1,012,476.

Patented Dec. 19, 1911.
5 SHEETS—SHEET 1.

Witnesses
J. N. Rice
E. W. Cady

Inventor
Charles A. Street
By E. E. Vrooman,
his Attorney.

C. A. STREET.
GENERATOR.
APPLICATION FILED AUG. 1, 1911.

1,012,476.

Patented Dec. 19, 1911.
5 SHEETS—SHEET 2.

Witnesses
J. W. Nees
E. W. Cady

Inventor
Charles A. Street

By E. E. Vrooman
his Attorney

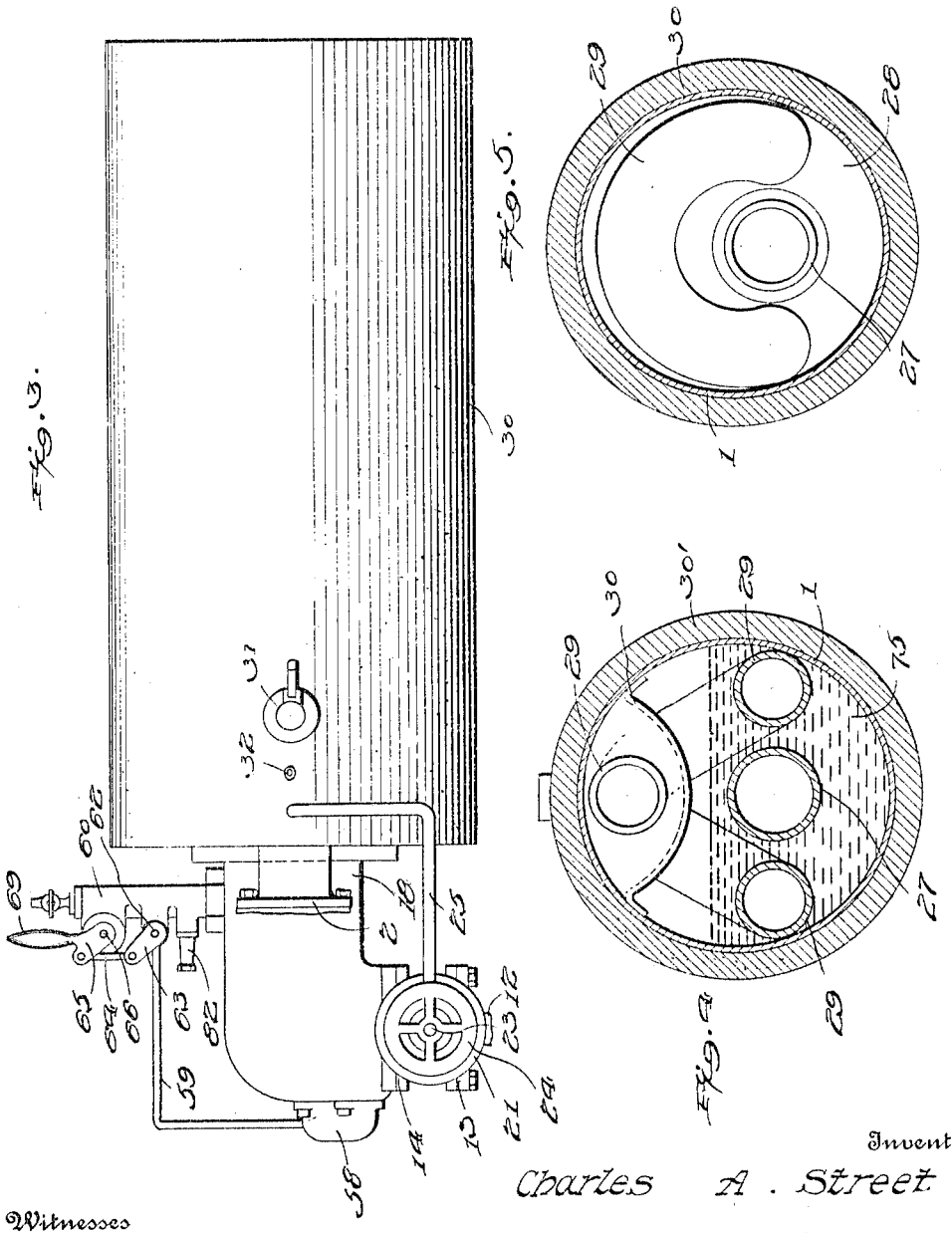

C. A. STREET.
GENERATOR.
APPLICATION FILED AUG. 1, 1911.
1,012,476.
Patented Dec. 19, 1911.
5 SHEETS—SHEET 4.
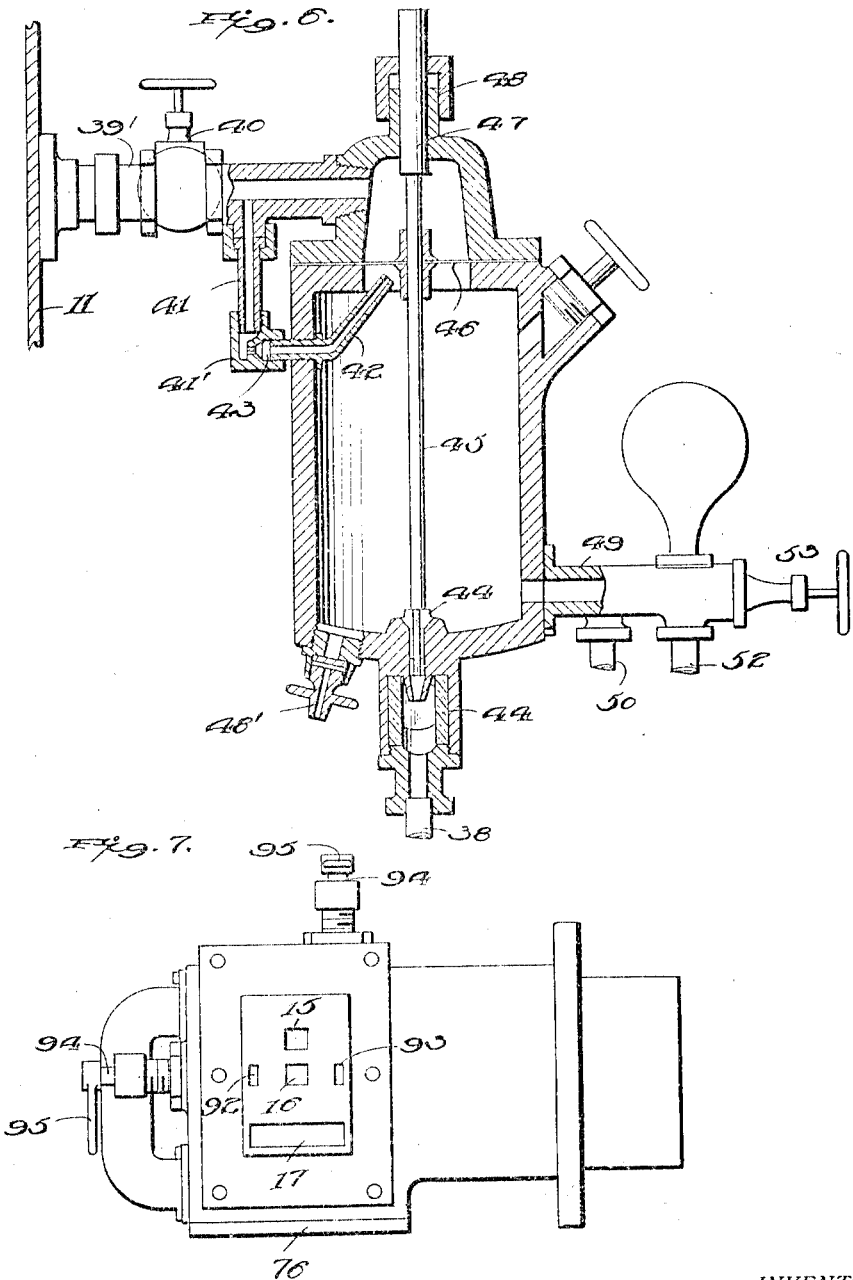

C. A. STREET.
GENERATOR.
APPLICATION FILED AUG. 1, 1911.
1,012,476.
Patented Dec. 19, 1911.
5 SHEETS—SHEET 5.
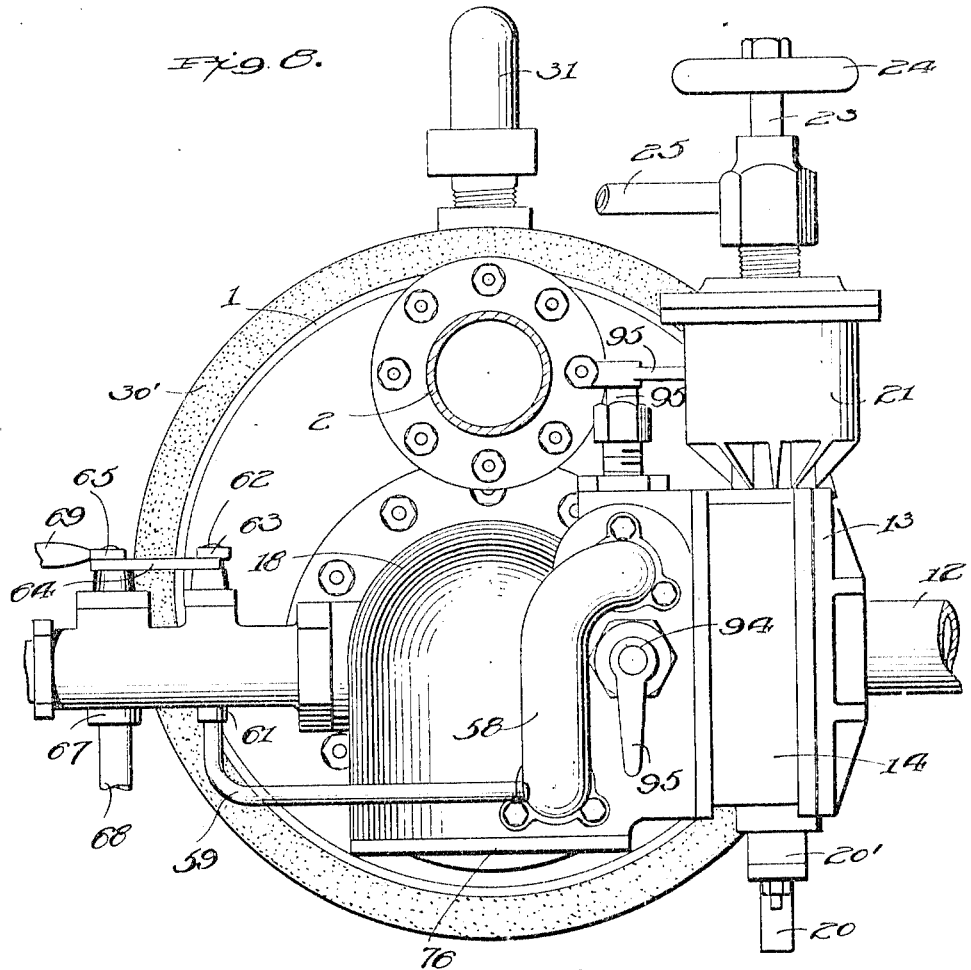
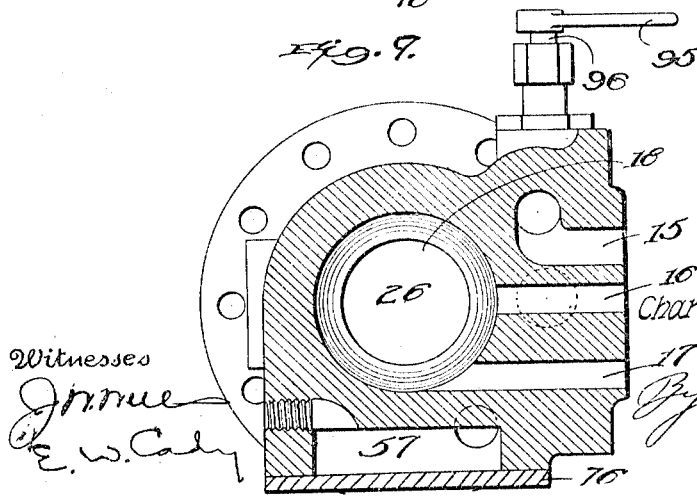
Witnesses
Inventor
Charles A. Street

UNITED STATES PATENT OFFICE.

CHARLES A. STREET, OF ST. LOUIS, MISSOURI.

GENERATOR.

1,012,476.     Specification of Letters Patent.     Patented Dec. 19, 1911.

Application filed August 1, 1911. Serial No. 641,738.

*To all whom it may concern:*

Be it known that I, CHARLES A. STREET, a citizen of the United States, residing at St. Louis, in the State of Missouri, have invented certain new and useful Improvements in Generators, of which the following is a specification, reference being had therein to the accompanying drawing.

This invention relates to gas engines and has especial reference to that class of gas engines in which a combustible mixture of gas and air is ignited in the engine.

The invention has for its object to provide an improved gas engine by means of which the gas and air are separately fed to a combustion chamber remote from the operating piston and cylinder and ignited and the products of combustion cooled and then mixed with steam conveyed to the operating piston and cylinder.

The invention further has for its object to provide an improved gas engine by means of which gas and air are separately conveyed to a combustion chamber remote from the operating piston and cylinder and ignited therein, and the heat from the products of combustion reduced so as to be safely worked in the engine.

With these and other objects the invention consists of certain novel constructions, combinations and arrangements of parts as hereinafter fully described and claimed.

Figure 1:
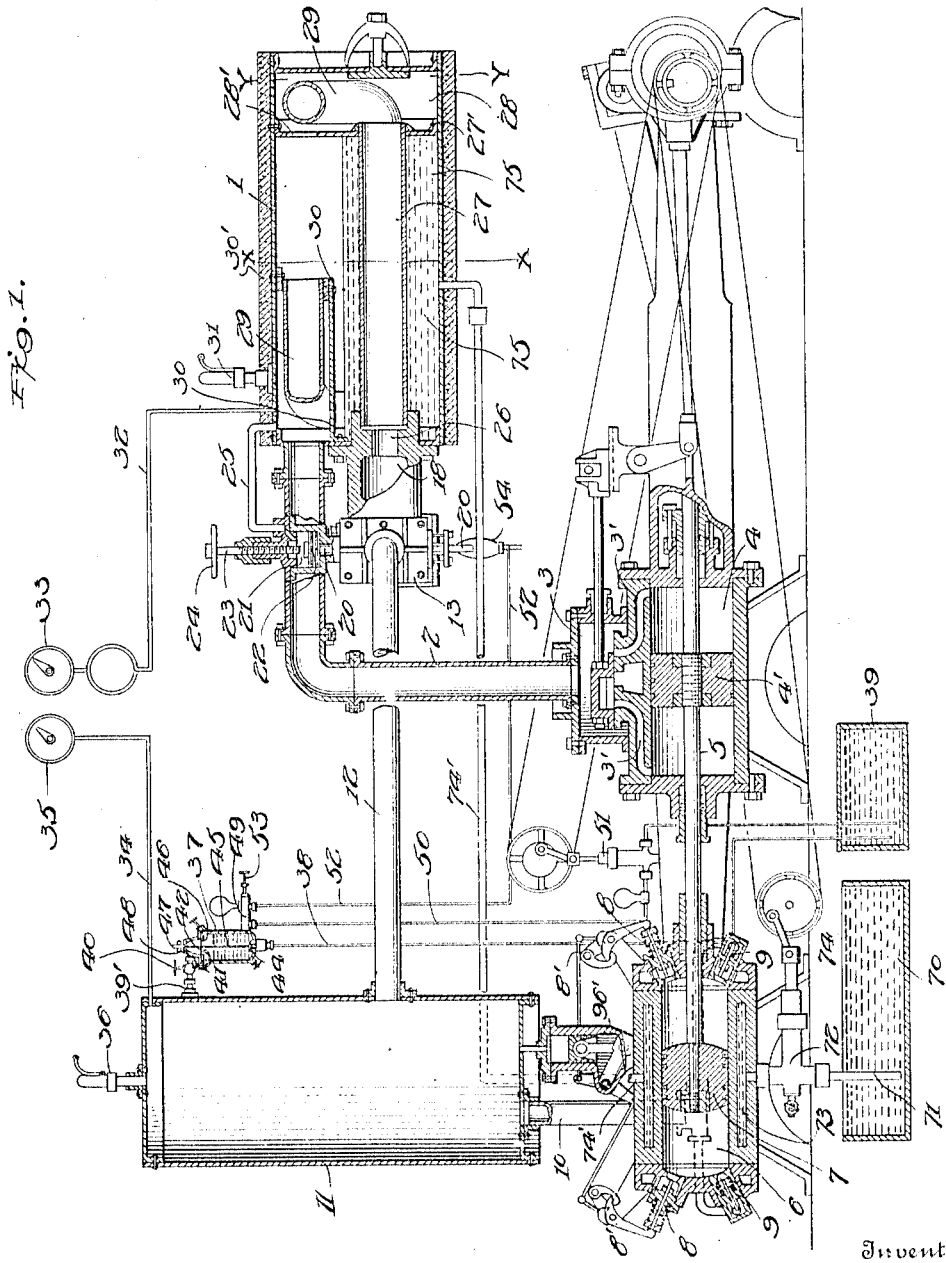
Figure 2:
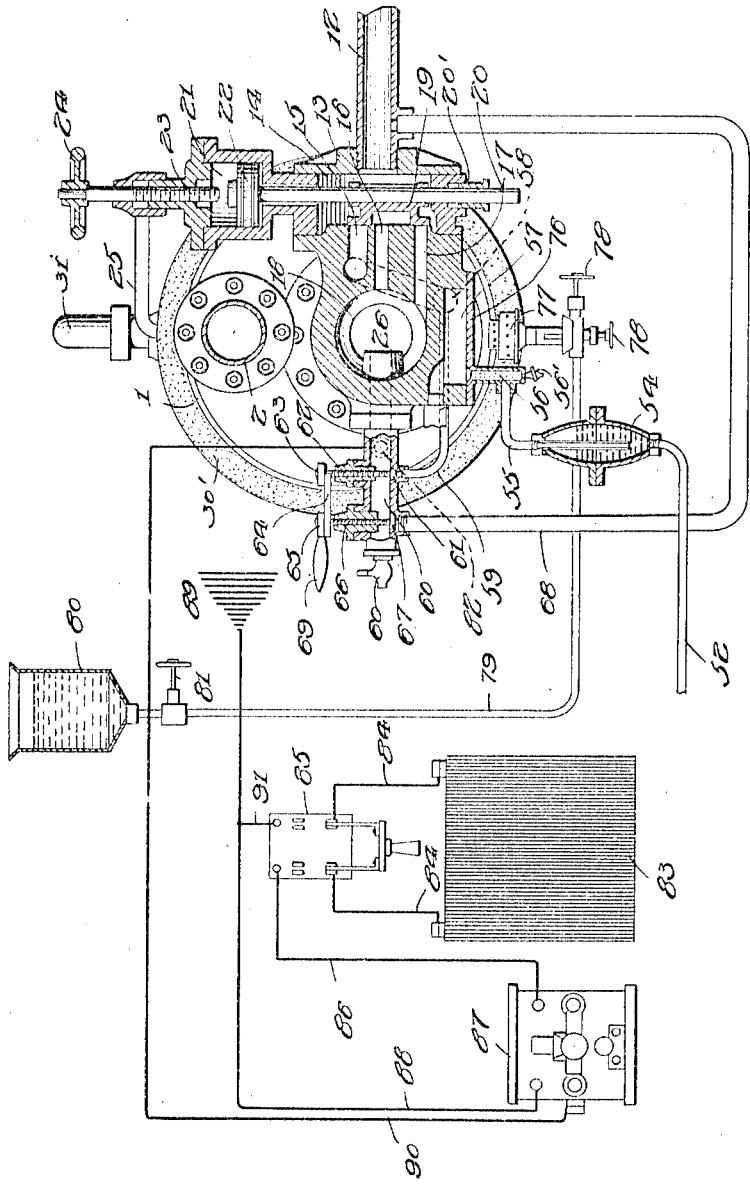

Referring to the accompanying drawings:—Figure 1 is a view in longitudinal section with parts broken away of a gas engine constructed in accordance with this invention. Fig. 2 is a view in cross section of the generator and ports connected therewith including the gas and air inlet ports, and a diagrammatic view of the means for igniting the spark. Fig. 3 is a plan view of the generator and the combustion chamber connected therewith. Fig. 4 is a view in cross section of the generator on the line X—X, Fig. 1. Fig. 5 is a view in cross section of the generator on the line Y—Y, Fig. 1. Fig. 6 is an enlarged detail view in vertical section with parts broken away of the automatic fuel feeder. Fig. 7 is a detail view of the air feed valve chest and ports and the combustion chamber. Fig. 8 is an end view of the generator, the combustion chamber and casing of the air and gas ports of the combustion chamber. Fig. 9 is an end view in cross section of the combustion chamber and the gas and air ports connected therewith.

The apparatus constructed in accordance with this invention consists of a cylindrical casing 1 forming the generating chamber which is connected by a pipe 2 with the valve chest 3 of the ordinary form of engine, said valve chest being connected by ports 3' with a cylinder 4 in which is located a piston 4' mounted on a piston rod 5 extending through said cylinder and operated by the engine and projecting at its forward end into a cylinder 6 in which is located a piston 7 for compressing air in said cylinder. The cylinder 6 is provided with intake valves 8 controlled by cut off mechanisms 8' and with discharge valves 9. The cylinder 6 is connected by a pipe 10 with the lower end of an air reservoir 11 which is connected by a pipe 12 with the air feed valve chest 13 covering the valve chest 14 into which opens the gas port 15 and the air ports 16 and 17. The air ports 16 and 17 open into a combustion chamber 18 mounted on one end of the generator 1. Covering the ports 15 and 16 and 17 is a valve 19 located in the valve chest 14 and mounted on a piston rod 20 having one end projecting beyond the stuffing box 20' and serving as a balancing stem, the other end of the piston rod 20 projecting into a cylinder 21 and having mounted thereon a piston 22 movable in said cylinder. Projecting into the cylinder 21 is a screw rod 23 provided with a wheel handle 24 by means of which the rod may be advanced into the cylinder 21 to bear against the end of the piston 20 and thereby lock the valve 19 in closed position over the ports 15, 16, and 17.

The cylinder 21 is connected by a steam pipe 25 with the generator 1 and the combustion chamber 18 is connected by a passage way 26 with an injection tube 27 extending longitudinally through the generator 1 and supported at its outer end in a partition 27' and opening into an expansion chamber 28 which opens into the upper part of the generator 1 by means of an opening 28'. Projecting horizontally in the upper part of the generator 1 with its open end facing toward the opening 28' is one end of a pipe 29 which projects through the bottom of the casing 30 and downward to the lower part of the generator 1 and longitudinally through the same into the expansion chamber 28 and forming a loop therein and back from said chamber and up into the casing 30. The generator 1 is preferably covered with a sheet of asbestos 30' whereby the heat is retained within the generator 1.

Mounted on the generator 1 is a relief valve 31 and connected with the generator 1 is a pipe 32 having on its end a gage 33. Connected with the upper end of the air reservoir 11 is a pipe 34 having on its end a gage 35 and mounted on the top of the air reservoir 11 is a relief valve 36. Located adjacent to the upper end of the reservoir 11 is an automatic fuel feeder 37 which is connected at its lower end by a pipe 38 with a fuel supply tank 39, the upper end of the automatic fuel feeder 37 being connected with the air reservoir 11 by means of a pipe 39' controlled by a valve 40, a branch pipe 41 being connected with and depending from said pipe 39 and connected at its lower end by a valve joint 41' with one end of an air intake pipe 42 controlled by a check valve 43. Mounted in the upper end of the passage way in the lower end of the automatic fuel feeder 37 is a valve 44 mounted on a rod 45 to which is secured at the upper end of the automatic fuel feeder a diaphragm 46, said rod 45 having at its upper end a balance stem 47 which projects through and beyond a bushing 48.

Connected with the lower end of the automatic fuel feeder is a laterally projecting pipe 49 which is connected with one end of a pipe 50 which extends down to the fuel supply tank 39 and in which pipe is located a pump 51 driven by the engine. Also connecting with the pipe 49 is a pipe 52 controlled by a valve 53, the pipe 52 leading to an air chamber 54 which is connected by means of a pipe 55 with a pipe 56 depending from a gas generating chamber 57, the pipe 56 having a drain cock 56' at its lower end. The gas generating chamber 57 is connected by a short pipe 58 with the gas port 15 and by a pipe 59 with a by-pass mixing chamber 60, said pipe 59 being controlled by a valve 61 on the lower end of a screw stem 62 having mounted on its upper end a lateral arm 63 connected by an arm 64 with a lateral arm 65 having at its lower end a valve 67 which controls a pipe 68 leading to the main air supply pipe 12. The valves 61 and 67 are operated by means of a handle 69 connected to the lever 65.

Projecting into a water supply reservoir 70 is a pipe 71 which is connected by a branch pipe 72 with the water jacket 73 of the cylinder 6, the water being pumped into said water jacket by a pump 74 operated by the engine. Leading from the water jacket 73 is a pipe 74' by means of which water is supplied to the generator 1 thereby forming a water jacket 75 about the injection tube 27. The bottom of the gas generator 57 is formed of a plate 76 preferably of copper, which, being heated, serves to vaporize the gas in the gas generating chamber 57. The plate 76 is heated by a gasolene burner 77 located beneath the same and controlled by valves 78 and connected to one end of a pipe 79 at the other end of which is a gasolene tank 80 elevated at a distance above the gas generating chamber 57 and controlled by a supply valve 81. Located in the by-pass of the chamber 60 is a spark plug 82 which is ignited by means of an electrical apparatus consisting of a battery 83 connected by branch wires 84 with a double throw switch 85, which in turn is connected by a wire 86 with a spark coil 87, said spark coil being connected by a wire 88 with the ground 89 and by a wire 90 with the spark plug 82, the switch 85 being connected also by a wire 91 with the wire 88.

Located in the air feed valve chest 13 are auxiliary air ports 92 and 93 which are controlled by valves on a stem 94 operated by a handle 95, as shown in Fig. 7. The amount of air conveyed to the compressor is regulated by an air pressure regulator 96, as shown in Fig. 1, which is connected by a series of levers with the cut off mechanisms 8'.

The operation of the device is as follows: Instead of igniting a combustible mixture in the engine—as is the case in the ordinary gas engine—the compressed air pumped through the pipe 12 is conducted to the air port 17 while the gas conducted through the pipe 58 is fed in by the port 15. Consequently, there is no danger of the combustion charge igniting past the valve. The gas is fed through the pipe 58 to the generating chamber 57 and is there vaporized by the plate 76 heated by the gasolene burner 77. The fuel is fed to the heated plate 76 under the same pressure that the air is fed, which is 210 pounds per square inch gage pressure. The fuel is fed by gravity from the automatic fuel feeder 37, the latter being located at a suitable distance above the level of the plate 76. The gas will automatically control itself since fuel fed to the vaporizing plate 76 will create more gas hence the gas pressure will exceed the air pressure momentarily. This will force the fuel back into the automatic fuel feeder 37 until all the fuel is forced away from the heated plate 76 so that no more gas will be generated until the gas already supplied has been used up. This will cause the gas pressure to slightly exceed the air pressure, such excess depending upon the distance the fuel feeder 37 is placed above the plate 76. The fuel is automatically regulated by the diaphragm 46 since as the fuel is pumped into the fuel feeder 37 through the pipe 50 when the pressure increases on the lower side of the diaphragm 46 it will be deflected upward, slightly lifting the valve 44 and thereby permitting the fuel to return through the pipe 38 to the reservoir 39. By means of a sight glass 44' in the lower end of the fuel feeder 37 it can be easily determined whether the fuel feed pump 51 is working properly. The check valve 43 prevents any air returning from the fuel chamber. The extension 47 of the rod 45 serves as a balance to the pressure on the valve 44. Sediment may be drawn off from the chamber of the feeder 37 by means of a drain cock 48'.

Gas is fed to the combustion chamber 18 by means of the valve 19 where it comes in contact with the air from the port 60. The air port should be five times as wide as the gas port. This is necessary in order to obtain a suitable mixture. However, the mixture does not explode in this generator but is rapidly expanded after becoming ignited. The stem 20 having the balance end projecting into the outside air provides a proper combustion area since the piston 22 limits the pressure in the generator to 210 pounds per square inch. At 200 pounds the pressure on the upper side of the piston 22 exceeds that on the underside and thus causes it to descend carrying with it the valve 19 which shuts off the mixture from the combustion chamber.

When the valve 19 is completely closed over the ports 15, 16, and 17 and in order to reignite the charge when the valve is open, another charge is fed in constantly on a small scale from the by-pass mixing chamber 60 out of the by-pass injection tube 70' into the combustion chamber 18 and the by-pass flame is ignited by the spark plug 82 by closing the switch 85. By means of the cock 60' it can be determined whether the by-pass flame is burning properly.

By means of the hand wheel 24 the threaded stem 23 is operated to lock the piston 22 and the valve 19 thereby preventing the ports 15, 16, and 17 from being uncovered. This is necessary when first starting in order to prevent the unburned charge from entering into the combustion chamber until the fuel has had time to generate into gas which requires but a few minutes. After this has occurred the lever 69 is operated and the electric spark communicated to the spark plug by closing the circuit. The circuit is then broken and the flame continues to burn as long as the proper amount of air is maintained. After the by-pass projection 70' is put into operation the threaded rod 23 is released from the piston 22 and the latter immediately rises thereby moving the valve 19 so as to allow the charge to come in contact with the flame from the by-pass projection 70'. Whenever the mixture requires more air in proportion to gas the auxiliary air ports 92 and 93 are opened which increases the air in proportion to the gas and upon operating the second handle 95 the air is again changed to a different proportion of gas.

The charge burning internally will create a tremendous heat and in order to prevent the heat from reaching over a certain point to which it can be safely worked in the engine the burning charge is conveyed through the injection tube 27 which is surrounded by the water jacket 75. This causes the burning charge to lose a portion of its heat, which is given to the water, thus causing the water to quickly rise to the boiling point which is about 388° F. at 200 lbs. per square inch. The injection tube 27 is of such a length that the products of combustion are completely burned up by the time they leave said tube. After leaving the tube 27 the burned gas passes into the extension chamber 28 and from there through opening 28' to the generator where it immediately mixes with the steam and passes through the tubes 29 under water to the casing 30, from whence it passes through the tube to the engine. The tubes 29 prevent any possible danger of the heated gas coming into contact with the engine until the steam passes through with it since the generator is thoroughly steam jacketed and there is little heat by external radiation. Furthermore the heat that the air pressure gives off when operated is transmitted to the water that is circulated about the cylinder 6. This water is fed direct to the generator which effects another saving.

It is evident that as the water comes to a boiling point about 388° F. the burning temperature cannot greatly exceed this temperature. Furthermore, the charge being mixed with the steam it gives the steam more body and prevents it from condensing quickly as otherwise would be the case in an external generator or boiler as it is commonly called.

The air chamber 54 is necessary in order to compensate for the return flow of fuel from the generating chamber 57. The air chamber 54 serves in turn to force the fuel back into the fuel feeder 37.

What I claim is:—

1. In an engine of the kind described, a combustion chamber separate from the engine provided with air and gas inlet ports, an air feed valve chest, a balance piston rod extending through said valve chest, a valve on said rod closing said ports, a cylinder, a piston located in said cylinder on the end of said piston rod, a steam pipe connected with said cylinder, and an adjusting screw projecting into said cylinder and adapted to lock said piston rod and valve.

2. In an engine of the kind described, a combustion chamber separate from the engine provided with air and gas intake ports, and a gas generating chamber having its bottom formed of a metallic plate, means for heating said plate, means for supplying fuel to said gas generating chamber, and means for automatically withdrawing the excessive fuel supplied to said generating chamber.

3. In an engine of the kind described, an air compressing cylinder having a water jacket, an air supply reservoir connected with said cylinder, a generator located therein, an expansion chamber opening into the upper part of the generator, and an injector pipe extending longitudinally in said generating chamber and opening into said expansion chamber, a water jacket surrounding said injector pipe, and a pipe connecting the water jacket of the compressing cylinder with the generator for supplying water to said jacket.

4. A gas engine, an air compressor operated by said gas engine, a combustion chamber located at a point away from the gas engine, means for supplying air and gas separately to said combustion chamber, means for regulating the pressure of the air delivered to said combustion chamber, a gas generator connected with said combustion chamber, means for automatically regulating the supply of gas to said generating chamber, a generator connected with said combustion chamber, means for conducting the burned products of combustion to said generating chamber, means for reducing the heat of said products of combustion as they are passed through said generating chamber, and mingling steam therewith, and means for conducting the said mingled steam and cooled products of combustion to the gas engine.

5. In an apparatus of the kind described, a gas engine having a cylinder, a piston and piston rod projecting out of said cylinder, an air compression cylinder and piston mounted on the end of said piston rod of the gas engine, an air reservoir connected with said air compressing cylinder, a combustion chamber located at a point remote from the gas engine, a fuel supply tank, an automatic fuel feed regulator connected with the air reservoir, an overflow pipe connecting said regulator with the fuel supply tank, a supply pipe connecting said regulator with the fuel supply tank, a pump connected with said fuel supply pipe, a gas generating chamber adjacent to said combustion chamber, a supply pipe connecting said fuel feed regulator with said generating chamber, an air supply pipe connecting said air reservoir with said combustion chamber, means for separately delivering gas and air to said combustion chamber, a generator connected with said combustion chamber, an injector pipe located in said generator and connected with said combustion chamber, an expansion chamber in said generator connected with said injector pipe and with the upper part of said generator, pipes connecting the upper part of the generator with a casing therein, said pipes and said injector pipe each having a water jacket, and a pipe leading from the casing in the generator to said cylinder of the gas engine for conducting thereto a mixture of steam and the burned products of combustion.

6. In an apparatus of the kind described, a gas engine with a cylinder and piston, a compressed air cylinder and piston operated by said gas engine piston, an air reservoir connected with said air compressing cylinder having a water jacket, an air pressure regulator connecting said cylinder with said air reservoir, an automatic fuel feed regulator connected with said air reservoir, a generator having an expansion chamber connecting with the upper part of the generator, an injector pipe extending longitudinally in said generator and communicating with said expansion chamber, a pipe located in said generator and having an open end in the upper part of said generator communicating with said expansion chamber, said pipe extending backward and forward in said generator, a casing in the upper part of said generator into which the other end of said pipe opens, a water jacket surrounding said injector pipe, and said last named pipe, a water circulating pipe connected with the jacket of the air compressing cylinder and with said generator, a pipe connected with said casing in the generator and with the gas engine cylinder, a steam pipe connected with said casing in the generator, means for feeding air and gas separately to the combustion chamber, and means for regulating the supply of air and gas thereto.

In testimony whereof I hereunto affix my signature in presence of two witnesses.

CHARLES A. STREET.

Witnesses:
JOHN H. LARMORE,
GUS. J. STREET.